(12) United States Patent
Scheibel et al.

(10) Patent No.: US 9,080,062 B2
(45) Date of Patent: Jul. 14, 2015

(54) METHOD FOR THE ESTABLISHMENT OF A CRACK RESISTANT EPOXY PAINT COAT AND PAINT COMPOSITIONS SUITABLE FOR SAID METHOD

(71) Applicant: Hempel A/S, Lyngby (DE)

(72) Inventors: Kim Scheibel, Allerod (DK); Jorn Kahle, Horsholm (DK); Michael Stanley Pedersen, Pully (CH); Lars Thorslund Pedersen, Lyngby (DK)

(73) Assignee: HEMPEL A/S, Lyngby (DK)

( * ) Notice: Subject to any disclaimer, the term of this patent is extended or adjusted under 35 U.S.C. 154(b) by 0 days.

(21) Appl. No.: 14/320,063

(22) Filed: Jun. 30, 2014

(65) Prior Publication Data

US 2014/0314959 A1  Oct. 23, 2014

Related U.S. Application Data

(62) Division of application No. 11/920,098, filed as application No. PCT/DK2006/000249 on May 11, 2006, now Pat. No. 8,945,680.

(30) Foreign Application Priority Data

May 12, 2005 (EP) .................................. 05388042

(51) Int. Cl.
  *B05D 5/00* (2006.01)
  *C09D 163/00* (2006.01)
  (Continued)

(52) U.S. Cl.
  CPC .............. *C09D 5/024* (2013.01); *C09D 7/1283* (2013.01); *C09D 7/1291* (2013.01);
  (Continued)

(58) Field of Classification Search
  CPC ..... C09D 5/024; C09D 7/1283; C09D 7/1291; C09D 163/00; C09D 7/14
  USPC .............................. 427/384, 385.5, 386, 2, 33
  See application file for complete search history.

(56) References Cited

U.S. PATENT DOCUMENTS

| 3,649,338 A | 3/1972 | Ishida |
| 5,192,816 A | 3/1993 | Iizuka |
| 5,565,126 A | 10/1996 | Kimura et al. |

FOREIGN PATENT DOCUMENTS

| EP | 0 230 145 A2 | 7/1987 |
| EP | 0952194 A2 | 10/1999 |

(Continued)

OTHER PUBLICATIONS

"Paint Specification No. 22—Epoxy Polyamide Paints (Primer, Intermediate, and Topcoat)", SSPC: The Society for Protective Coatings, pp. 6-63-6-67, 2004.

(Continued)

*Primary Examiner* — Gregory R Delcotto
(74) *Attorney, Agent, or Firm* — Birch, Stewart, Kolasch & Birch, LLP (57) ABSTRACT

The present invention relates to a method for the establishment of a crack resistant epoxy paint coat and paint compositions suitable for said method. The method is developed for use in ballast tanks e.g. a ballast tank of a vessel. The method involves the steps: (i) applying a paint composition comprising an epoxy-based binder system onto the surface thereby forming a curable paint film on the surface, and (ii) allowing the curable paint film to cure thereby forming the epoxy paint coat. The paint composition has a viscosity of at the most 140 KU, when ready to be applied. The paint composition comprises 35-80% by solids volume of the paint of an epoxy-based binder system having a ratio between the hydrogen equivalents and the epoxy equivalents in the range of 20:100 to 120:100. The paint composition furthermore comprises 0.5-30% by solids volume of the paint of one or more fibers. The fibers have an average length, of at the most 250 μm.

9 Claims, 1 Drawing Sheet

(51) Int. Cl.
| | |
|---|---|
| *C09D 5/02* | (2006.01) |
| *C09D 7/12* | (2006.01) |
| *C09D 163/04* | (2006.01) |
| *C08K 7/04* | (2006.01) |
| *C08K 7/02* | (2006.01) |
| *C08K 7/06* | (2006.01) |

(52) U.S. Cl.
CPC ........... *C09D 163/00* (2013.01); *C09D 163/04* (2013.01); *C08K 7/02* (2013.01); *C08K 7/04* (2013.01); *C08K 7/06* (2013.01)

(56) References Cited

FOREIGN PATENT DOCUMENTS

| | | |
|---|---|---|
| JP | 59-78267 A | 5/1984 |
| JP | 60-55066 A | 3/1985 |
| JP | 1129054 A | 5/1989 |
| JP | 08231886 A | 9/1998 |
| JP | 2001-129054 A | 5/2001 |
| WO | WO 82/02709 A1 | 8/1982 |
| WO | WO 91/10706 A1 | 7/1991 |
| WO | WO 96/14274 A2 | 5/1996 |
| WO | WO 96/14454 A2 | 5/1996 |
| WO | WO 98/15198 A1 | 4/1998 |
| WO | WO 00/77102 A1 | 12/2000 |
| WO | WO 2005/033219 A2 | 4/2005 |

OTHER PUBLICATIONS

"Standard Test Method for Consistency of Paints Measuring Krebs Unit (KU) Viscosity Using a Stormer-Type Viscometer", Designation D 562-01, ASTM International, pp. 1-7, 2008.
10 ES Wollastocoat MSDS, 1995.
Askheim et al., "Why Do Paints Crack?", Ballast tank coating study focusing on brittleness and loss of flexibility, PCE, Mar. 2001, pp. 49-55.
Chetfield, H.V., et al., "Paint-and-lacquer coatings", Moscow, Chemistry, 1968, pp. 406 and 425, including partial English translation.
Datasheets for Alraldite GY 250 and Epoxy resin DER 671-X75.
Epoxy Curing Agents and Modifiers, Ancamide © 2050 Curing Agent pp. 1-7.
Guidance Manual for Tanker Structures, Witherby & Co., Ltd., 1997.
Hare, C. H., "Mechanisms of corrosion protection with surface-treated wollastonite pigments," PCI, Mar. 1998, pp. 74.
Hare, C. H., "Paint Film Degradation: Mechanisms and Control," Chapter 18, 2001, pp. 147-154.
Hare, C. H., "Protective Coatings: Fundamentals of Chemistry and Composition", 1994, pp. 206 and 290-291.
Hare, C. H., "The evolution of calcium metasilicate in paint and coatings", Modern Paint & Coatings, vol. 83, No. 12, pp. 32, 1993.
Hare, Clive H., "Protective coatings—Fundamentals of Chemistry and Composition", Technology Publishing Company, pp. 206, 222 and 437, 1994.
Hawley's Condensed Chemical Dictionary, 1987, p. 521.
Hempadur 45141/45143 datasheet 2003.
IMO Resolution MSC, 215(82), (adopted Dec. 8, 2006), Performance standard for protective coatings for dedicated seawater ballast tanks in all types of ships and double-side skin spaces of bulk carriers, pp. 1-23.
Kirk-Othmer Encyclopedia of Chemical Technology, 5th Edition, vol. 10, pp. 418, 2005.
Lim et al., "Stress Analysis and Evaluation of Cracks Developed on the Coatings for Welded Joints of Water Ballast Tanks", Corrosion 2005, Houston, USA, pp. 1-10.
Office Action issued on Jan. 17, 2013 in corresponding Korean Application No. 7029097/2007.
Paken, A. M. et al., "Epoxy compounds and epoxy resins", State scientific and technical editorship of chemical literature, Leningrade, 1962, pp. 614-617 and 622-625, including partial English translation.
Product Data Sheet for Ancamide 805 (Air Products, Publication No. 125-9927), May 1999.
Product Data Sheet for MS 6000 Roxul 1000.
Product Data Sheet for NYAD G® Wollastocoat (Nyco Minerals, Publication No. IN-164-05-1), 2002.
Rawle, A., "Basic principles of particle-size analysis," Surface Coatings International Part A Coatings Journal, JOCCA, vol. 86, A02, pp. 58-65.
Saidarasamoot, Siltha et al., "Assessment of the Emerging Technologies for the Detection and Measurement of Corrosion Wastage of Coated Marine Structures," Proceedings of the OMAE '03: The 22nd International Conference on Offshore Mechanics & Arctic Engineering, Cancun, Mexico, Jun. 8-13, 2003 pp. 167-177.
U.S. Federal Specifications and Standards, "General Specification for Paint Epoxy-Polyamide-MIL-DTL-24441C(SH)", Preparing Activity: Navy—SH, Project 8010-N0006, pp. 1-21, May 19, 1999.
Viscosity Conversion Chart (Paul O. Abba').
Wollastocoat ES-10 (Nyco Minerals, Publication No. IN-166-01), 2002.

METHOD FOR THE ESTABLISHMENT OF A CRACK RESISTANT EPOXY PAINT COAT AND PAINT COMPOSITIONS SUITABLE FOR SAID METHOD

CROSS REFERENCE TO RELATED APPLICATIONS

This application is a Divisional of copending application Ser. No. 11/920,098, now U.S. Pat. No. 8,945,680 filed on Nov. 8, 2007, which was filed as PCT International Application No. PCT/DK2006/000249 on May 11, 2006, which claims the benefit under 35 U.S.C. §119(a) to Patent Application No. 05388042.3, filed in European Patent Office on May 12, 2005, all of which are hereby expressly incorporated by reference into the present application.

FIELD OF THE INVENTION

The present invention relates to a method for the establishment of a crack resistant epoxy paint coat at the surface represented by the interior of the angles formed between structural elements of a ballast-tank of a partly or fully submersible structure. The present invention provides improved crack resistance of such an epoxy paint coat by incorporation of specific types of fibres.

BACKGROUND OF THE INVENTION

Existing epoxy products for coating a ballast-tank of a partly or fully submersible structure, such as a vessel or a semi submersible oil rig, show relatively high crack susceptibility when applied in extreme high dry film thickness. Cracks may occur during launch or during service in places with too high dry film thickness. Too high dry film thickness is especially observed in association with the interior of the angles formed between the structural elements, where the shape of the surface is such that a paint film with even thickness is seldom achieved. Existing epoxy products are typically specified in a total dry film thickness of 250-500 µm, but in association with the interior of the angles formed between the structural elements there is a risk of getting far higher dry film thicknesses than specified. Too high coating thickness, often exceeding normal acceptance limits, causes high curing shrinkage stress and may enhance cracking.

The factors leading to cracking of ballast tank coatings are studied in recent articles by Askheim et al. ("Why do paints crack. Ballast tank coating study focusing on brittleness and loss of flexibility" Protective Coating Europe, March 2001, pp 49-55) and Lim et al. ("Stress Analysis and Evaluation of Cracks Developed on the Coatings for Welded Joints of Water Ballast Tanks" Paper presented at "Corrosion 2005", Houston, USA).

The epoxy coat in a ballast tank is exposed to many stress inducing environmental effects, E.g. special environmental effects in ballast tanks of vessels include elevated temperature on areas, such as bulkheads adjacent to cargo holds and engine rooms, cyclic sun-heating underneath the main deck, water sloshing, reverse impacts from heavy loading equipment, and hydrostatic pressure changes from ballasting/deballasting cycles. The environmental effects give special demands to the flexibility and cracking resistance of an epoxy coat applied in the ballast tank of a partly or fully submersible structure. Cracks in the paint film will lead to corrosion due to the presence of water, typically sea water, when ballast is required.

The brittleness of the epoxy coat is believed to be related to limitations in the flexibility of basic epoxy chemistry. The epoxide group can react with various curing agents. Epoxide groups can also homopolymerise with themselves to varying degrees. The end result is a three-dimensional network of long chain molecules with limited flexibility. The flexibility varies with the type and amount of curing agent as well as type and amount of flexibilisers. If much more than the stoichiometric amount of curing agent is added to the epoxy resin, the flexibility is improved, but mechanical strength and anticorrosive properties are reduced.

JP 59-78267A discloses a coating composition comprised of an epoxy resin, a curing agent, an inorganic staple fiber and a coating compounding agent. The coating composition is mainly used for a corrosion-proofing coating at the inside and outside of steel pipes.

A method is required for the establishment of a crack resistant epoxy paint coat at the surface represented by the interior of the angles formed between structural elements of a ballast tank of a partly or fully submersible structure.

SUMMARY OF THE INVENTION

Thus, the underlying problem for the present invention is to provide a method for the establishment of a crack resistant epoxy paint coat at the surface represented by the interior of the angles formed between structural elements of a ballast tank of a partly or fully submersible structure, said method comprising:
  (i) applying a paint composition comprising an epoxy-based binder system onto said surface thereby forming a curable paint film on said surface, and
  (ii) allowing said curable paint film to cure thereby forming the epoxy paint coat;
wherein the paint composition has a viscosity of at the most 140 KU and comprises
  35-80% by solids volume of the paint of an epoxy-based binder system having a ratio between the hydrogen equivalents and the epoxy equivalents in the range of 20:100 to 120:100, and
  0.5-30% by solids volume of the paint of one or more fibres selected from the group consisting of natural inorganic fibres, synthetic inorganic fibres, natural organic fibres, synthetic organic fibres, and metallic fibres, said fibres having an average length, of at the most 250 µm.

The present invention also relates to paint compositions as such.

DETAILED DESCRIPTION OF THE INVENTION

It has now been found that by applying an epoxy paint comprising fibres at the surface represented by the interior of the angles formed between the structural elements of a ballast-tank of a partly or fully submersible structure, a crack resistant epoxy paint coat is established.

More specific, the invention relates to a method for the establishment of a crack resistant epoxy paint coat at the surface represented by the interior of the angles formed between structural elements of a ballast tank of a partly or fully submersible structure.

When used herein, the term "interior of the angles formed between structural elements of a ballast tank" is intended to mean the surface extending 20 cm from both sides of the junction between structural elements (e.g. metal plates) forming the inner surface of a ballast tank and representing an angle of between 45° to 140°. At the surface represented by the interior of the angles formed between the structural elements there is a problem with too high dry film thickness that may result in cracking.

Examples of junctions between structural elements forming the inner surface of a ballast tank and representing an angle of between 45° to 140° include, but are not limited to, junctions between vertical sides, junctions between vertical sides and the top of a ballast tank, junctions between vertical sides and the bottom of a ballast tank and junctions between vertical sides and stiffening members of a ballast tank.

Figure 1:
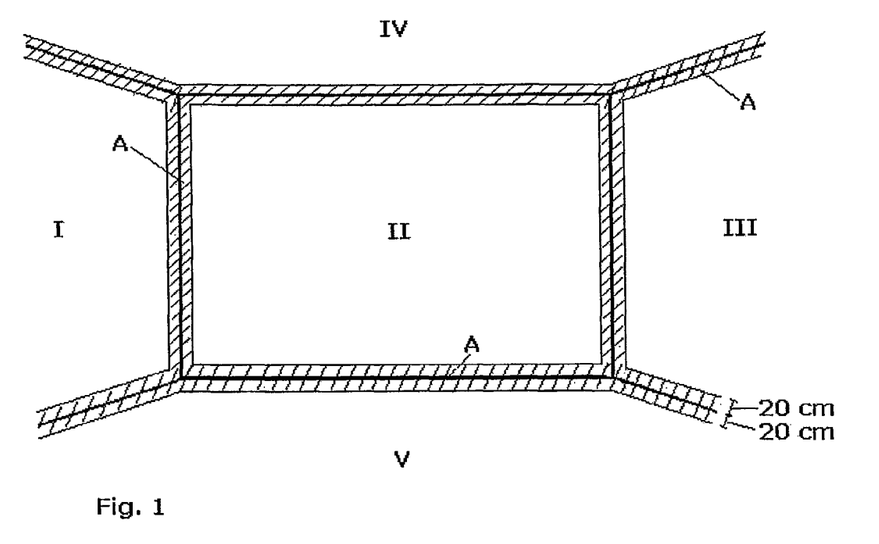
FIG. 1 shows a portion of a ballast tank and illustrates the surface represented by the interior of the angles formed between structural elements of the ballast-tank. For simplification stiffening members typically present in a ballast tank are not included in FIG. 1.

The interior of the angles formed between structural elements of a ballast tank is illustrated schematically in FIG. 1. Referring to FIG. 1 the surface (A), the hatched area extending 20 cm from both sides of the junctions between the vertical sides (I, II, III), between the vertical sides (I, II, III) and the tank top (IV) and between the vertical sides (I, II, III) and the tank bottom (V) is the interior of the angles formed between the structural elements according to the above definition.

Figure 2:
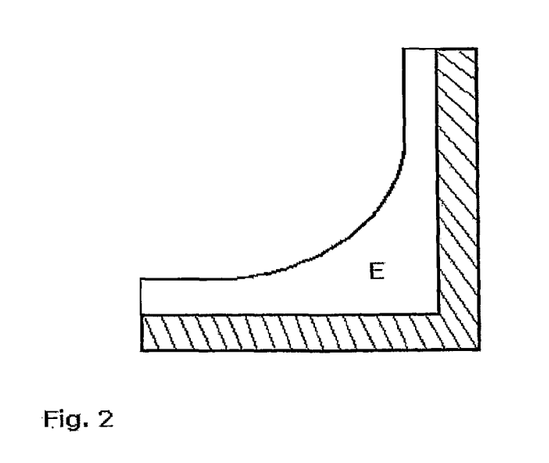
FIG. 2 illustrates the high dry film thickness of the epoxy paint coat that is prone to arise due to the shape of the surface of a ballast-tank.

The problem with too high dry film thickness is illustrated schematically in FIG. 2. FIG. 2 is a cross cut of a part of the surface (A) of FIG. 1 after application of the epoxy paint coat (E).

Structural elements of a ballast tank, e.g. metal plates, such as steel plates, are joined typically by welding. To construct a ballast tank, it is required that some of the structural elements are joined to form an interior angle of 45° to 140°.

When used herein, the term "structural elements of a ballast tank" is intended to include sides, top, bottom and stiffening members of a ballast tank. Examples of stiffening members are longitudinals, girders and stringers. Such stiffening members are well known to the person skilled in the art and detailed examples are given in "Guidance manual for tanker structures", Tanker Structure Co-operative Forum. Witherby, London 1997, FIG. 1.1.

Examples of partly or fully submersible structures are vessels (including but not limited to boats, ocean liners, tankers, container ships and other cargo ships, submarines and naval vessels of all types) or semi submersible oil rigs etc.

The method further comprises the steps:
(i) applying a paint composition comprising an epoxy-based binder system onto said surface thereby forming a curable paint film on said surface, and
(ii) allowing said curable paint film to cure thereby forming the epoxy paint coat;

The paint composition may be applied by means of any of the usual techniques used within the paint field. Preferred application techniques are spraying, e.g. airless spraying, and by means of a brush or a roller.

The method of the invention is intended to include applications where the epoxy paint is applied both to the surface represented by the interior of the angles formed between the structural elements and to other surfaces of the ballast-tank. The epoxy paint may be applied on the whole surface of the ballast-tank or only on parts of the surface, as long as parts of the surface applied include parts of the surface represented by the interior of the angles formed between the structural elements.

Paint Composition to be Used in the Method.

The paint composition to be used in the method of the present invention is a film-forming paint composition, i.e. the combination of the paint constituents should make it possible to prepare a film of substantially uniform thickness.

The paint compositions to be used in the method of the present invention need to be applicable by spray or brush opposed to pastes or similar products. It should therefore be understood that the paint compositions to be used in the method of the present invention have a viscosity of at the most 140 Krebs Unit (KU) at the application temperature. The viscosity is determined just after the paint composition has been mixed and is ready to be applied. The viscosity is determined according to ASTM D562-01 with the modification that the temperature of the specimen is the application temperature.

Fibres

Generally, "fibres" is intended to cover any fibres within the groups of natural inorganic fibres, synthetic inorganic fibres, natural organic fibres, synthetic organic fibres, and metallic fibres, or mixtures thereof. Without being bound to any specific theory, it is, however, presently believed that natural inorganic fibres and synthetic inorganic fibres, in particular mineral fibres of these types, are especially preferred.

It is presently believed that the fibres to be used within the present invention should fulfil certain criteria with respect to dimensions in order to provide the improved properties of the paints within the present invention. Thus, with respect to average length and average thickness of the fibres which are added to the paint during manufacture of the paint or mixed with the paint before application, such fibres have an average length, of at the most 250 μm and an average thickness of 1-50 μm.

Preferred fibres are fibres having an average thickness of 1-25 μm and an average length, of at the most 250 μm, especially an average length of 25-250 μm and an average thickness of 1-25 μm, in particularly an average length of 50-250 μm (such as 50-170 μm) and an average thickness of 2-10 μm. The preferred fibres furthermore have a ratio between the average length and the average thickness of at least 2, such as at least 3 e.g. at least 5.

It should be noted that the term "length" refers to the greatest dimension of the fibre particle in question. The term "average" when used in connection with length indicates that a certain variation of the length of fibres exists within the distribution of the fibres used. The term "average thickness" also refers to the fibres in question, however, with regard to the distribution of fibres also taking into account the longitudinal and cross-sectional variation with each individual fibre.

In order for a certain particle to be considered as a fibre within the present context, the ratio between the greatest dimension and the smallest dimension perpendicular to the length dimension in substantially all points along the longitudinal axis (the length dimension–longest dimension) should not exceed 2.5:1, preferably not exceed 2:1. Furthermore, the ratio between the longest dimension and the second smallest of the two shortest dimensions should be at least 2:1, preferably at least 5:1. Thus, fibres are characterised of having one long dimension and two short dimension, where the long dimension is longer than the two short dimensions (typically by an order of magnitude, or even more), and the two short dimensions are substantially equal (of the same order of magnitude). For completely regular fibres, i.e. fibres having a cylindrical shape, it is evident how to determine the "length"

(longest dimension) and the two (identical) shortest dimensions. For more irregular fibres, it is believed that the relationship between the dimensions can be evaluated by the following hypothetical experiment: A regular, right-angled box is constructed around the fibre. The box is constructed so as to have the smallest possible volume as it should fully comprise the fibre. To the extent that the fibre is curved, it is (again hypothetically) assumed that the fibre is flexible so that the volume of the hypothetical box can be minimised by "straightening" the fibre. In order for the "fibre" to be recognised as so in the present context, the ratio between the two smallest dimensions of the box should be at the most 2.5:1 (preferably 2:1) and the ratio between the longest dimension of the box and the second smallest of the two smallest dimensions of the box should be at least 2:1, preferably at least 5:1.

The above is given as a general guideline in order to exclude other types of particles which may be referred to as "fibres" but which do have less satisfactory properties within the present invention. In particular, the term "fibre" is not intended to include so-called inorganic "fibre" materials which are used as fillers (e.g. frayed type fillers with no well defined dimensions, such as asbestine), cf. Hawley's Condensed Chemical Dictionary, 11$^{th}$ Ed., (Sax and Lewis, eds.), Van Nostrand Reinhold Company, New York, 1987, page 521. Neither does "fibre" include flake type fillers, e.g. mica, flake shaped clay minerals, aluminium flakes or glass flakes cf. the definition above. With respect to "curved" fibres, it should be understood that the length dimension should be considered as the length along the curve defined by the fibre.

The surface of the fibres may or may not have been modified (surface treated) by chemical or physical processes. Examples of such modification processes used to improve the beneficial effects of the fibres are carbonisation; silylation; surface oxidation; etching, such as treatment with alkali metal hydroxide, treatment with hydrofluoric acid; coating; poly electrolytic entrapment in the porous surface structures; adsorption processes; hydrogen-bonding processes; cationic bonding processes; esterification; anionic bonding processes; etc. as well as any modification processes included in the manufacturing of the fibres.

In an interesting embodiment, the fibres to be incorporated in the paints are biodegradable under physiological conditions, especially in the respiratory organs (the lungs) of mammals, especially humans. Thus, it is believed that especially interesting fibres are those which are able to biodegrade when present in a modified Gamble's solution as defined in WO 96/14454, page 9. The degree of biodegradability should preferably be at least 20 nm/day, such as at least 30 nm/day, in particular at least 50 nm/day when tested as described in WO 96/14454. Examples of suitable biodegradable fibres are the ones described in WO 96/14454 and WO 96/14274. A specific example thereof is the commercially available MS 600 Roxul 1000, ex. Lapinus Fibres BV (see below). The biodegradability is especially relevant for mineral fibres.

The fibres may, as it will be clear from the description of the manufacture processes further below, be added together with the remaining paint constituents before milling or the fibres may be added afterwards. It can, however, be expected that the average length of the fibres will be somewhat reduced during the paint manufacture process (see further below), e.g. due to the applied shear forces and/or milling process. (Milling and intensive stirring is typically performed in order to break up agglomerates of pigments and other particles in the paint composition). It is believed that the paint manufacture process should preferably be performed so that the fibres in the ready-to-use paint have an average length corresponding to at least 75% of the pre-manufacture average length.

The concentration of the fibres is normally in the range of 0.5-30% by solids volume of the paint, such as 0.5-20% by solids volume of the paint. Especially relevant concentrations of fibres, depending upon the type and size of the fibres, may be 2-20%, such as 3-18%, such as 5-15% by solids volume of the paint.

It should be understood that the above ranges refer to the total amount of fibres, thus, in the case where two or more fibre types are utilised, the combined amounts should fall within the above ranges.

Inorganic Fibres

Generally, "inorganic fibres" is intended to cover any fibres within the groups of natural inorganic fibres, synthetic inorganic fibres, and metallic fibres, or mixtures thereof. Without being bound to any specific theory, it is, however, presently believed that natural inorganic fibres and synthetic inorganic fibres, in particular mineral fibres of these types, are especially preferred.

By mineral fibres should be understood fibres made using minerals as starting materials. According to this definition, mineral fibres include both crystalline materials as well as amorphous materials formed by a melting process.

In the present invention, preferred Inorganic fibres are inorganic fibres having an average thickness of 1-25 μm and an average length, of at the most 250 μm, especially an average length of 25-250 μm and an average thickness of 1-25 μm, in particularly an average length of 50-250 μM (such as 50-170 μm) and an average thickness of 2-20 μm (such as 2-10 μm). The preferred inorganic fibres furthermore have a ratio between the average length and the average thickness of at least 2, such as at least 5, preferably a ratio between the average length and the average thickness of at least 10, in particularly at least 15, such as at least 20.

Examples of inorganic fibres are carbide fibres, such as silicon carbide fibres, boron carbide fibres, niobium carbide fibres; nitride fibres, such as silicon nitride fibres; boron containing fibres, such as boron fibres, boride fibres; silicon-containing fibres, such as silicon fibres, alumina-boron-silica fibres, E-glass (non-alkaline alumoborosilicate) fibres, C-glass (non-alkaline or low-alkaline soda lime-alumoborosilicate) fibres, A-glass (alkaline soda lime-silicate) fibres, S-glass fibres, CEMFIL-glass fibres, ARG-glass fibres, mineral-glass fibres, non-alkaline magnesia alumosilicate fibres, quartz fibres, silicic acid fibres, silica fibres, high-silica fibres, alumina high-silica fibres, alumosilicate fibres, aluminium silicate fibres, magnesia alumosilicate fibres, soda borosilicate fibres, soda silicate fibres, polycarbosilane fibres, polytitanocarbosilane fibres, polysilazane fibres, hydridopolysilazane fibres, tobermorite fibres, samarium silicate fibres, wollastonite fibres, potassium aluminium silicate fibres; metal fibres, such as iron fibres, aluminium fibres, steel fibres, iron fibres, zinc fibres; carbon fibres, such as pure carbon fibres, graphite fibres, slagwool fibres, charcoal fibres; rockwool fibres, such as pure rockwool fibres and basalt rockwool fibres; processed mineral fibres from mineral wool; volcanic rock fibres; attapulgite fibres; etc.; modified by any chemical or physical processes; and any mixture thereof.

It is presently believed that one very interesting group of fibres is inorganic fibres, in particular mineral fibres. Particularly preferred examples of such fibres are silicon-containing fibres; metal fibres; oxide fibres; carbon fibres; rockwool fibres; processed mineral fibres from mineral wool; volcanic rock fibres; wollastonite fibres; tobermorite fibres; attapulgite fibres.

At present, especially preferred are mineral fibres, such as mineral-glass fibres, wollastonite fibres, tobermorite fibres, attapulgite fibres, volcanic rock fibres, bauxite fibres, rockwool fibres, and processed mineral fibres from mineral wool. Examples of commercially available mineral fibres which are believed to improve the mechanical properties according to the invention are (average fibre length in μm; average fibre thickness in μm):

0. CoatForce CF10, ex. Lapinus Fibres BV (The Netherlands), (125±25; 7)
1. MS 600 Roxul 1000, ex. Lapinus Fibres BV (The Netherlands), volcanic rock fibre (125; 5)
2. MS 610 Roxul 1000, ex. Lapinus Fibres BV (The Netherlands), (225; 5.5)
3. FG 400/060, ex. Schwarzwälder Textil-Werke (Germany), E-glass (230; 9-14)
4. FG 440/040, ex. Schwarzwälder Textil-Werke (Germany), E-glass (150; 9-14)
5. Nyad G, ex. Nyco Minerals (USA), wollastonite (length/diameter ratio 15:1)
6. Nyglos M15, ex. Nyco Minerals (USA), wollastonite (length/diameter ratio 8:1)
7. Nyglos 8, ex. Nyco Minerals (USA), wollastonite (length/diameter ratio 19:1)
8. RCF-160, ex. Sumitomo (Japan), C-glass (250; -)
9. Isofrax 1260C High Index, ex. Unifrax (United Kingdom) (-; 2-3 μm)

Organic Fibres

Generally, "organic fibres" is intended to cover any fibres within the groups of natural organic fibres and synthetic organic fibres. In the present invention, preferred organic fibres are organic fibres having an average thickness of 1-25 μm and an average length, of at the most 250 μm, especially an average length of 25-250 μm and an average thickness of 1-25 μm, in particularly an average length of 50-250 μm (such as 50-170 μm) and an average thickness of 2-10 μm. The preferred organic fibres furthermore have a ratio between the average length and the average thickness of at least 2, such as at least 3 e.g. at least 5.

Examples of natural and synthetic organic fibres are aromatic polyamide fibres, such as poly(p-benzamide) fibres, poly(p-phenylene-terephthalamide) fibres, poly(p-phenylene-2,6-naphthalamide) fibres, poly(3,4'-diphenylether-terephthalamide) fibres, poly(p-phenylene-(p-benzamide)-terephthalamide) fibres, poly(p-benzhydrazide terephthalamide) fibres, poly(m-phenylene-isophthalamide) fibres, poly(N,N'-m-phenylene-bis(m-benzamide)-terephthalamide) fibres, poly(N,N'-m-phenylene-bis(m-benzamide)-2,6-naphthalamide) fibres, poly(N,N'-m-phenylene-bis(m-benzamide)-4,4'-biphenyl-dicarboxamide) fibres, poly(4,4'-bis(p-aminophenyl)-2,2'-bithiazole-isophthalamide) fibres, poly(2,5-bis(p-aminophenyl)-1,3,4-oxa-diazole-isophthalamide) fibres, poly(4,4'-diaminobenzanilide-isophthalamide) fibres, poly(2-methyl-p-phenylene-2,6-naphthalamide) fibres, poly(2,6-dichloro-p-phenylene-2,6-naphthalamide) fibres; aromatic polyhydrazide fibres, such as poly(terephthalic-m-phenylene-hydrazide) fibres, poly (terephthalic-hydrazide) fibres, poly(p-phenylene-N-methyl-hydrazide) fibres; aromatic polyester fibres, such as poly (chloro-1,4-phenylene-ethylene-dioxy-4,4'-benzoate-co-terephthalate) fibres, poly(chloro-1,4-phenylene-4,4'-oxydibenzoate) fibres, poly(methyl-1,4-phenylene-4,4'-oxydibenzoate) fibres, poly(chlorophenylene-hexahydroterephthalate) fibres; aromatic polyazomethine fibres, such as poly(nitrilo-(2-methyl-1,4-phenylene)nitrilo-methylidyne-1,4-phenylenemethylidyne) fibres; aromatic polyimide fibres, such as aromatic polypyromellitimide fibres, aromatic polytrimellitimide fibres, polyester-imide fibres, poly(4,4'-diphenyl-ether-pyromellitimide) fibres; aromatic heterocyclic polymeric fibres, such as polybenzimidazole fibres, such as poly-(2,2'-(m-phenylene)-5,5'-bibenzimidazole) fibres, polybenzothiazole fibres, such as poly(2-(1,4-phenylene)-2'-(6,6'-bibenzothiazole)) fibres and poly(2-(1,3-phenylene)-2'-(6,6'-bibenzothiazole)) fibres, polybenzoxazole fibres, such as poly((1,7-dihydrobenzo(1,2-d:4,5-d')dioxazole-2,6-diyl)-1,4-phenylene) fibres and poly ((benzo(1,2-d:4,5-d')bisoxazol-2,6-diyl)-1,4-phenylene) fibres, polyoxadiazole fibres, such as polyarylene-1,3,4-oxadiazole fibres; cellulose fibres, such as α-cellulose fibres, β-cellulose fibres, mineral cellulose fibres, methylcellulose fibres, cellucotton fibres, regenerated cellulose (rayon) fibres, cellulose acetate fibres, jute fibres, cotton fibres, linen fibres, ramie fibres, sisal fibres, heme fibres, flax fibres, cyanoethylated cellulose fibres, acetylated cellulose fibres; wood fibres, such as pine, spruce and fir wood fibres, lignin fibres and fibres of lignin derivatives; rubber fibres and fibres of derivatives of rubber; polyolefin fibres, such as polyethylene fibres, polypropylene fibres, polytetrafluoroethylene fibres, polybutadiene fibres; polyacetylene fibres; polyester fibres; acrylic fibres and modified acrylic fibres, such as acrylic acid fibres, styrol/acrylate fibres; acrylonitrile fibres, such as acrylonitrile fibres and polyacrylonitrile fibres; elastomeric fibres; protein fibres, such as casein fibres, maize protein fibres, soybean protein fibres, groundnut protein fibres; alginate fibres; poly(ethylene terephthalate) fibres; polyvinyl alcohol fibres; aliphatic polyamide fibres, such as nylon fibres e.g. nylon 6.6 fibres, nylon 6 fibres, nylon 6.10 fibres; poly(phenylene sulphide) fibres; polyvinylchloride fibres; polychloroethene fibres; poly(bisbenzimidazobenzophenanthrolin) fibres; polyoxymethylene fibres; polyurethane fibres; vinyl polymeric fibres; viscose fibres; etc.; modified by any chemical or physical processes; and any mixture thereof.

Examples of commercially available organic fibres which are believed to improve the mechanical properties according to the invention are (average fibre length in μm; average fibre thickness in μm):

10. Arbocel BE 600/30, ex. J. Rettenmaier & Söhne GmbH. (Germany), natural cellulose fibre (40; 20)
11. Lignocel C 120, ex. J. Rettenmaier & Söhne GmbH (Germany), wood fibre (70-150; -)
12. PAN60 ex. F.H. Wrigley Ltd (United Kingdom), polyacrylonitrile flock fibre, (max 250; 15)

It is, however, also presently believed that some organic fibres can be especially advantageous within the present invention. Particularly preferred examples of such fibres are aromatic polyamide fibres; aromatic polyester fibres; aromatic polyimide fibres; cellulose fibres; cotton fibres; wood fibres; rubber fibres and fibres of derivatives of rubber; polyolefin fibres (e.g. polypropylene fibres); polyacetylene fibres; polyester fibres; acrylic fibres and modified acrylic fibres; acrylonitrile fibres (e.g. preoxidised acrylonitrile fibres); elastomeric fibres; protein fibres; alginate fibres; poly(ethylene terephthalate) fibres; polyvinyl alcohol fibres; aliphatic polyamide fibres; polyvinylchloride fibres; polyurethane fibres; vinyl polymeric fibres; and viscose fibres. Presently even more preferred examples of such fibres are polyethylene fibres, polypropylene fibres, cotton fibres, cellulose fibres, polyacrylonitrile fibres, preoxidised polyacrylonitrile fibres, wood fibres and polyester fibres.

It is presently believe that a particularly interesting group of organic fibres is cellulose fibres, wood fibres and polyacrylonitrile fibres.

Epoxy-Based Binder System

The term "epoxy-based binder system" should be construed as the combination of the one or more epoxy resins, one or more curing agents, any reactive epoxy diluents and any reactive acrylic modifiers.

The epoxy-based binder system is one of the most important constituents of the paint composition, in particular with respect to the anticorrosive properties. Besides the anticorrosive properties, it is relevant that the epoxy paint coat resulting from the application of the paint composition is flexible.

The epoxy-based binder system comprises one or more epoxy resins selected from aromatic or non-aromatic epoxy resins (e.g. hydrogenated epoxy resins), containing more than one epoxy group per molecule, which is placed internally, terminally, or on a cyclic structure, together with one or more suitable curing agents to act as cross-linking agents. Combinations with reactive diluents from the classes mono functional glycidyl ethers or esters of aliphatic, cycloaliphatic or aromatic compounds can be included in order to reduce viscosity and for improved application and physical properties. The binder system can also include reactive acrylic modifiers, such as acrylate monomers and oligomers comprising at least two alpha, beta unsaturated carbonyl groups, reacting with the one or more curing agents via a Michael-type addition reaction.

Suitable epoxy-based binder systems are believed to include epoxy and modified epoxy resins selected from bisphenol A, bisphenol F, Novolac epoxies, non-aromatic epoxies, cycloaliphatic epoxies, glycidyl esters and epoxy functional acrylics or any combinations hereof. Examples of suitable commercially available epoxy resins are:

Epikote 828, ex. Resolution Performance Products (The Netherlands), bisphenol A type
Araldite GY 250, ex. Huntsman Advanced Materials (Switzerland), bisphenol A type
Epikote 1004, ex. Resolution Performance Products (Germany), bisphenol A type
DER 664-20, ex. Dow Chemicals (Germany), bisphenol A type
Epikote 1001 X 75, ex. Resolution Performance Products (The Netherlands), bisphenol A type
Araldite GZ 7071X75BD, ex. Huntsman Advanced Materials (Germany), bisphenol A type
DER 352, ex. Dow Chemicals (Germany), mixture of bisphenol A and bisphenol F
Epikote 232, ex. Resolution Performance Products (The Netherlands), mixture of bisphenol A and bisphenol F
Epikote 862, ex. Resolution Performance Products (The Netherlands), bisphenol F type
DEN 438-X 80, ex. Dow Chemical Company (USA), epoxy novolac
Epikote 154, ex. Resolution Performance Products (The Netherlands), epoxy novolac The epoxy-based binder system comprises one or more curing agents selected from compounds or polymers comprising at least two reactive hydrogen atoms linked to nitrogen.

Suitable curing agents are believed to include amines or amino functional polymers selected from aliphatic amines and polyamines (e.g. cycloaliphatic amines and polyamines), polyamidoamines, polyoxyalkylene amines (e.g. polyoxyalkylene diamines), aminated polyalkoxyethers (e.g. those sold commercially as "Jeffamines"), alkylene amines (e.g. alkylene diamines), aralkylamines, aromatic amines, Mannich bases (e.g. those sold commercially as "phenalkamines"), amino functional silicones or silanes, and including epoxy adducts and derivatives thereof. Examples of suitable commercially available curing agents are:

Cardolite NC-541, ex. Cardanol Chemicals (USA), Mannich base
Cardolite Lite 2001, ex. Cardanol Chemicals (USA), Mannich base
Sunmide CX-105X, ex. Sanwa Chemical Ind. Co. Ltd. (Singapore), Mannich base
Epikure 3140 Curing Agent, ex. Resolution Performance Products (USA), polyamidoamine
SIQ Amin 2030, ex. SIQ Kunstharze GmbH (Germany), polyamidoamine
Epikure 3115X-70 Curing Agent, ex. Resolution Performance Products (USA), polyamidoamine
SIQ Amin 2015, ex. SIQ Kunstharze GmbH (Germany), polyamidoamine
Polypox VH 40309/12, ex. Ulf Prümmer Polymer-Chemie GmbH (Germany), polyoxyalkylene amine
CeTePox 1490 H, ex. CTP Chemicals and Technologies for Polymers (Germany), polyoxyalkylene amine
Epoxy hardener MXDA, ex. Mitsubishi Gas Chemical Company Inc (USA), aralkyl amine
Diethylaminopropylamine, ex. BASF (Germany), aliphatic amine
Gaskamine 240, ex. Mitsubishi Gas Chemical Company Inc (USA), aralkyl amine
Cardolite Lite 2002, ex. Cardanol Chemicals (USA), Mannich base
Aradur 42 BD, ex. Huntsman Advanced Materials (Germany), cycloaliphatic amine
Isophorondiamin, ex. BASF (Germany), cycloaliphatic amine
Epikure 3090 Curing Agent, ex. Resolution Performance Products (USA), polyamidoamine adduct with epoxy
Crayamid E260 E90, ex. Cray Valley (Italy), polyamidoamine adduct with epoxy
Aradur 943 CH, ex. Huntsman Advanced Materials (Switzerland), alkylene amine adduct with epoxy
Aradur 863 XW 80 CH, ex. Huntsman Advanced Materials (Switzerland), aromatic amine adduct with epoxy Preferred epoxy-based binder systems comprises a) one or more epoxy resins selected from bisphenol A, bisphenol F and Novolac; and b) one or more curing agents selected from Mannich Bases, polyamidoamines, polyoxyalkylene amines, alkylene amines, aralkylamines, polyamines, and adducts and derivatives thereof.

Especially preferred epoxy-based binder systems comprise one or more bisphenol A epoxy resins and one or more curing agents selected from Mannich Bases, polyamidoamines and adducts and derivatives thereof.

Preferably, the epoxy resin has an epoxy equivalent weight of 100-2000, such as 100-1500, e.g. 150-1000, such as 150-700.

Especially preferred epoxy-based binder systems comprise one or more bisphenol A epoxy resins having an epoxy equivalent weight of 150-700 and one or more polyamidoamine or adducts and derivatives thereof.

Preferred epoxy-based binder systems are ambient curing binder systems.

In the paint composition, the total amount of epoxy-based binder system is in the range of 15-80%, such as 35-80%, e.g. 40-75% by solids volume of the paint.

Without being bound to any particular theory, it is believed that the selection of the ratio between the hydrogen equivalents of the one or more curing agents and the epoxy equivalents of the one or more epoxy resins plays a certain role for the performance of the coating composition.

When used herein, the term "hydrogen equivalents" is intended to cover only reactive hydrogen atoms linked to nitrogen.

The number of "hydrogen equivalents" in relation to the one or more curing agents is the sum of the contribution from each of the one or more curing agents. The contribution from each of the one or more curing agents to the hydrogen equivalents is defined as grams of the curing agent divided by the hydrogen equivalent weight of the curing agent, where the hydrogen equivalent weight of the curing agent is determined as: grams of the curing agent equivalent to 1 mole of active hydrogen. For adducts with epoxy resins the contribution of the reactants before adductation is used for the determination of the number of "hydrogen equivalents" in the epoxy-based binder system.

The number of "epoxy equivalents" in relation to the one or more epoxy resins is the sum of the contribution from each of the one or more epoxy resins. The contribution from each of the one or more epoxy resins to the epoxy equivalents is defined as grams of the epoxy resin divided by the epoxy equivalent weight of the epoxy resin, where the epoxy equivalent weight of the epoxy resin is determined as: grams of the epoxy resin equivalent to 1 mole of epoxy groups. For adducts with epoxy resins, the contribution of the reactants before adductation is used for the determination of the number of "epoxy equivalents" in the epoxy-based binder system.

It should be understood that if the epoxy-based binder system contains reactive acrylic modifiers then the number of "epoxy equivalents" is to be increased accordingly. E.g. if the epoxy-based binder system contains an acrylate oligomer comprising alpha, beta unsaturated carbonyl groups then the number of "alpha, beta unsaturated carbonyl group equivalents" are to be added to the epoxy equivalents of the one or more epoxy resins for the purpose of establishing the ratio between the hydrogen equivalents of the one or more curing agents and the epoxy equivalents of the one or more epoxy resins.

Preferably, the ratio between the hydrogen equivalents of the one or more curing agents and the epoxy equivalents of the one or more epoxy resins is in the range of 20:100 to 120:100.

Especially preferred epoxy-based binder systems for use in ballast tank coatings have a ratio between the hydrogen equivalents of the one or more curing agents and the epoxy equivalents of the one or more epoxy resins in the range of 60:100 to 120:100, such as 70:100 to 110:100.

Other Constituents

It has previously been common to include coal-tar in epoxy paint compositions. However due to a suspected carcinogenic effect it is preferred that epoxy paint compositions do not contain coal-tar. The presence of coal-tar furthermore makes it difficult to make light shades. Light shades are preferred in ballast-tanks to facilitate inspection for possible damages to the paint film. Thus, in a preferred embodiment the coating composition comprises 0% by solids volume of the paint of coal-tar.

The paint composition may comprise plasticizers. Examples of plasticizers are hydrocarbon resins, phthalates and benzyl alcohol. In one preferred embodiment, the paint composition comprises a hydrocarbon resin as plasticizer.

In the paint composition, the total amount of plasticizers (e.g. hydrocarbon resins) may be in the range of 0-30%, such as 0-25% by solids volume of the paint, preferably 1-25%, such as 1-20% by solids volume of the paint.

The paint composition may comprise other paint constituents as will be apparent for the person skilled in the art. Examples of such paint constituents are pigments, fillers, additives (e.g. epoxy accelerators, surfactants, wetting agents and dispersants, de-foaming agents, catalysts, stabilizers, corrosion inhibitors, coalescing agents, thixotropic agents (such as polyamide waxes), anti-settling agents and dyes).

In the paint composition, the total amount of pigments and fillers may be in the range of 0-50%, such as 5-50% by solids volume of the paint, preferably 10-45%, such as 10-40% by solids volume of the paint.

It is envisaged that certain pigments and fillers have a beneficial effect on the anticorrosive properties. Examples are aluminium pigments, zinc phosphate and mica. In one preferred embodiment, the paint composition comprises 0-10% by solids volume of the paint of aluminium pigments, preferably 1-7%, such as 2-6% by solids volume of the paint. In an alternative embodiment, the composition comprises at the most 10% by dry weight of the paint of aluminium pigments.

In the paint composition, the total amount of additives may be in the range of 0-10%, such as 0.1-8% by solids volume of the paint.

The paint composition may comprise epoxy accelerators. Examples are substituted phenols, such as 2,4,6-tris(dimethylamino methyl) phenol, p-tert-butylphenol, nonyl phenol etc.

The paint composition typically comprises a solvent or solvents. Examples of solvents are alcohols, such as water, methanol, ethanol, propanol, isopropanol, butanol, isobutanol and benzyl alcohol; alcohol/water mixtures, such as ethanol/water mixtures; aliphatic, cycloaliphatic and aromatic hydrocarbons, such as white spirit, cyclohexane, toluene, xylene and naphtha solvent; ketones, such as methyl ethyl ketone, acetone, methyl isobutyl ketone, methyl isoamyl ketone, diacetone alcohol and cyclohexanone; ether alcohols, such as 2-butoxyethanol, propylene glycol monomethyl ether and butyl diglycol; esters, such as methoxypropyl acetate, n-butyl acetate and 2-ethoxyethyl acetate; and mixtures thereof.

Depending on the application technique, it is desirable that the paint comprises solvent(s) so that the solids volume ratio (SVR—ratio between the volume of solid constituents to the total volume) is in the range of 30-100%, preferably 50-100%, in particular 55-100% e.g. 60-100%.

SVR is determined according to ISO 3233 or ASTM D 2697 with the modification that drying is carried out at 20° C. and 60% relative humidity for 7 days instead of drying at higher temperatures.

Preparation of the Paint Composition

The paint may be prepared by any suitable technique that is commonly used within the field of paint production. Thus, the various constituents may be mixed together using a high speed disperser, a ball mill, a pearl mill, a three-roll mill etc. The paints according to the invention may be filtrated using bag filters, patron filters, wire gap filters, wedge wire filters, metal edge filters, EGLM turnoclean filters (ex. Cuno), DELTA strain filters (ex. Cuno), and Jenag Strainer filters (ex. Jenag), or by vibration filtration.

The paint composition to be used in the method of the invention is prepared by mixing two or more components e.g. two pre-mixtures, one pre-mixture comprising the one or more epoxy resins and one pre-mixture comprising the one or more curing agents. It should be understood that when reference is made to the paint composition, it is the mixed paint composition ready to be applied. Furthermore, all amounts stated as % by solids volume of the paint should be understood as % by solids volume of the mixed paint composition ready to be applied.

Novel Paint Compositions

It is believed that at least some of the epoxy paint compositions defined herein for the method of the invention is novel as such. Thus, a further aspect of the invention relates to a paint composition, said paint composition having a viscosity of at the most 140 KU at 30° C. and comprising:

35-80% by solids volume of the paint of an epoxy-based binder system having a ratio between the hydrogen equivalents and the epoxy equivalents in the range of 20:100 to 120:100, and 0.5-30% by solids volume of the paint of one or more fibres selected from the group comprising natural inorganic fibres, synthetic inorganic fibres, natural organic fibres, synthetic organic fibres, and metallic fibres, said fibres having an average length, of at the most 250 µm.

Yet a further aspect of the present invention relates to a paint composition having a viscosity of at the most 140 KU at 30° C. and comprising:

35-80% by solids volume of the paint of an epoxy-based binder system having a ratio between the hydrogen equivalents and the epoxy equivalents in the range of 70:100 to 110:100, and 0.5-30% by solids volume of the paint of one or more fibres selected from the group comprising natural inorganic fibres, synthetic inorganic fibres, natural organic fibres, synthetic organic fibres, and metallic fibres, said fibres having an average length, of at the most 250 µm.

In one interesting embodiment hereof, the coating composition comprises 1-25% by solids volume of the paint of a plasticizer.

In a more specific variant hereof, the coating composition comprises:

40-75% by solids volume of the paint of an epoxy-based binder system having a ratio between the hydrogen equivalents and the epoxy equivalents in the range of 70:100 to 110:100, 0.5-30% by solids volume of the paint of one or more fibres selected from the group comprising natural inorganic fibres, synthetic inorganic fibres, natural organic fibres, synthetic organic fibres, and metallic fibres, said fibres having an average length, of at the most 250 µm, and 1-20% by solids volume of the paint of a plasticizer.

Yet a further aspect of the present invention relates to a paint composition having a viscosity of at the most 140 KU at 30° C. and comprising:

35-80% by solids volume of the paint of an epoxy-based binder system having a ratio between the hydrogen equivalents and the epoxy equivalents in the range of 70:100 to 110:100, 0.5-30% by solids volume of the paint of one or more fibres selected from the group comprising natural inorganic fibres, synthetic inorganic fibres, natural organic fibres, synthetic organic fibres, and metallic fibres, said fibres having an average length, of at the most 250 µm, and 1-7% by solids volume of the paint of aluminium pigments.

Another aspect of the present invention relates to a paint composition having a viscosity of at the most 140 KU at 30° C. and comprising:

35-80% of an epoxy-based binder system comprising one or more novolac epoxy resins and one or more curing agents selected from alkylene amines and aralkyl amines, said epoxy-based binder system having a ratio between the hydrogen equivalents and the epoxy equivalents in the range of 20:100 to 50:100, and 0.5-30% by solids volume of the paint of one or more fibres selected from the group comprising natural inorganic fibres, synthetic inorganic fibres, natural organic fibres, synthetic organic fibres, and metallic fibres, said fibres having an average length, of at the most 250 µm.

Another aspect of the present invention relates to a paint composition having a viscosity of at the most 140 KU at 30° C. and comprising:

15-80%, such as 35-80%, e.g. 40-75%, by solids volume of the paint of an epoxy-based binder system having a ratio between the hydrogen equivalents and the epoxy equivalents in the range of 20:100 to 120:100, such as 60:100 to 120:100 or 20:100 to 50:100, 0.5-30%, such as 2-20%, e.g. 3-18% by solids volume of the paint of fibres, said fibres having an average length, of at the most 250 µm, 5-50%, such as 10-45%, e.g. 10-40% by solids volume of the paint of fillers and pigments, 0-30% or 1-25%, such as 1-20% by solids volume of the paint of plasticizers, and 0-10% or 0.1-8% by solids volume of the paint of additives.

In a more specific variant hereof, the coating composition consist of:

35-80%, such as 40-75%, by solids volume of the paint of an epoxy-based binder system having a ratio between the hydrogen equivalents and the epoxy equivalents in the range of 20:100 to 120:100, such as 60:100 to 120:100 or 20:100 to 50:100, 0.5-30%, such as 2-20%, e.g. 3-18% by solids volume of the paint of fibres, said fibres having an average length, of at the most 250 µm, 5-50%, such as 10-45%, e.g. 10-40% by solids volume of the paint of fillers and pigments, 0-30% or 1-25%, such as 1-20% by solids volume of the paint of plasticizers, 0-10% or 0.1-8% by solids volume of the paint of additives, and one or more solvents.

With respect to the above mentioned aspects, the selection of fibres, epoxy-based binder system and other constituents are essentially as described and exemplified herein above.

Among the novel epoxy paint compositions defined herein for the method of the invention, it is contemplated that there are some that may advantageously be used for other methods than the method of the present invention. It is envisaged that such paint compositions may advantageously be used in methods for establishing a crack resistant epoxy paint coat in for example cargo holds and liquid storage tanks, such as water tanks and chemical tanks, and for establishing crack resistant epoxy paint coat on for example Rail cars, Containers, Bridges, cranes and Wind turbines.

Liquid Storage Tank

In one preferred embodiment, a novel epoxy paint composition defined herein for the method of the invention is used in a method for establishing a crack resistant epoxy paint coat on the interior surface of a liquid storage tank, said method comprising (i) applying a paint composition comprising an epoxy-based binder system onto the surface of the interior of a liquid storage tank thereby forming a curable paint film on said surface, and (ii) allowing said curable paint film to cure thereby forming the epoxy paint coat;

wherein the paint composition has a viscosity of at the most 140 Ku and comprises:

35-80% by solids volume of the paint of an epoxy-based binder system having a ratio between the hydrogen equivalents and the epoxy equivalents in the range of 20:100 to 120:100, and 0.5-30% by solids volume of the paint of one or more fibres selected from the group comprising natural inorganic fibres, synthetic inorganic fibres, natural organic fibres, synthetic organic fibres, and metallic fibres, said fibres having an average length, of at the most 250 µm.

Examples of liquid storage tanks where such a method may advantageously be used are storage tanks for Food oil; Light oil; Palm oil; Lube oil; Vegetable oil; crude oil and refined fuel products, such as Gasoline, Heavy fuel, Jet fuel, Refinery fuel, Unleaded gasoline, Diesel, Kerosene; Gas, such as LPG (liquefied petroleum gas), LNG (liquefied natural gas), Butan, Nitrogen; Water, such as Process water, Demineralised water, Waste water, Potable water; organic solvents, such as Naphtha, Methanol, Ethylene glycol, Ethylbenzene, Aromatics, Benzene/cyclohexane mixtures, benzene/toluene/xylene mixtures; Chemicals, such as Sodium hydroxide, Asphalt, Propylene, Glycerine, Ammonia, Ethylene. The examples of liquid storage tanks include both stationary tanks as well as movable liquid storage tanks e.g. liquid storage tanks on vessels.

Some types of liquid storage tanks require a high degree of chemical resistance. To ensure a high degree of chemical resistance, epoxy paint compositions used in a method for establishing a crack resistant epoxy paint coat in a liquid storage tank where a high degree of chemical resistance is required, should preferably comprise one or more novolac epoxy resins and/or bisphenol F resins.

In one interesting embodiment hereof, a novel epoxy paint composition defined herein for the method of the invention is used in a method for establishing a crack resistant epoxy paint coat in liquid storage tanks where a high degree of chemical resistance is required, said method comprising:

(i) applying a paint composition comprising an epoxy-based binder system onto the surface of the interior of a liquid storage tank thereby forming a curable paint film on said surface, and (ii) allowing said curable paint film to cure thereby forming the epoxy paint coat;

wherein the paint composition has a viscosity of at the most 140 KU and comprises:

35-80% of an epoxy-based binder system comprising one or more novolac epoxy resins and one or more curing agents selected from alkylene amines and aralkyl amines, said epoxy-based binder system having a ratio between the hydrogen equivalents and the epoxy equivalents in the range of 20:100 to 50:100, and 0.5-30% by solids volume of the paint of one or more fibres selected from the group comprising natural inorganic fibres, synthetic inorganic fibres, natural organic fibres, synthetic organic fibres, and metallic fibres, said fibres having an average length, of at the most 250 μm.

The invention also relates to similar methods for establishing a crack resistant epoxy paint coat on rail cars, containers, bridges, cranes, wind turbines etc.

Examples

Materials

Fibre 1: MS 600 Roxul 1000, ex. Lapinus Fibres BV (The Netherlands)
Fibre 2: Arbocel BE600/30 PU, ex. J. Rettenmaier & Söhne Gmbh (Germany)
Fibre 3: Nyglos 8, ex. Nyco Minerals (USA)
Fibre 4: PAN60 polyacrylonitrile flock fibre, ex. F.H. Wrigley Ltd/Wrigley Fibres (United Kingdom)

HEMPADUR 45143-11480 is an anticorrosive epoxy paint from Hempel A/S that may be specified for ballast tanks. The epoxy-based binder system of 45143-11480 consists of: Bisphenol A epoxy resins having epoxy equivalent weights within the interval 150-700 and a polyamidoamine as curing agent. HEMPADUR 45143-11480 furthermore comprises a modified aromatic hydrocarbon resin as plasticizer (the amount Is within the interval 1-25% by solids volume of the paint). The viscosity is less than 140 KU at 30° C. The ratio between the hydrogen equivalents of the one or more curing agents and the epoxy equivalents of the one or more epoxy resins is in the range of 70:100 to 110:100. The ratio between the hydrogen equivalents of the one or more curing agents and the epoxy equivalents of the one or more epoxy resins is not affected when adding fibres 1-4.

HEMPADUR 15500-50900 is an anticorrosive epoxy paint from Hempel A/S that may be specified for ballast tanks. The epoxy-based binder system of HEMPADUR 15500-50900 consists of: A novolac epoxy resin having an epoxy equivalent weight within the interval 150-700, bisphenol A epoxy resins having epoxy equivalent weights within the interval 150-700 and as curing agents an alkylene amine and an aralkyl amine. The viscosity is less than 140 KU at 30° C. The ratio between the hydrogen equivalents of the one or more curing agents and the epoxy equivalents of the one or more epoxy resins is in the range of 20:100 to 50:100. The ratio between the hydrogen equivalents of the one or more curing agents and the epoxy equivalents of the one or more epoxy resins is not affected when adding fibres 1-4.

HEMPADUR PRO 45601-19870 is an anticorrosive epoxy paint from Hempel A/S that may be specified for ballast tanks. The epoxy-based binder system of HEMPADUR PRO 45601-19870 consists of: Bisphenol A epoxy resins having epoxy equivalent weights within the interval 150-700 and a polyamidoamine as curing agent. HEMPADUR PRO 45601-19870 furthermore comprises aluminium pigment (the amount is within the interval 1-7% by solids volume of the paint) and a modified aromatic hydrocarbon resin as plasticizer (the amount is within the interval 1-25% by solids volume of the paint). The viscosity is less than 140 KU at 30° C. The ratio between the hydrogen equivalents of the one or more curing agents and the epoxy equivalents of the one or more epoxy resins is in the range of 60:100 to 120:100. The ratio between the hydrogen equivalents of the one or more curing agents and the epoxy equivalents of the one or more epoxy resins is not affected when adding fibres 1-4.

Intershield ENA300 is an aluminium pure epoxy anticorrosive paint from International Marine Coatings Ltd. which is suitable for application over prepared shop primers. The paint can be specified to various areas including water ballast tanks. The epoxy-based binder system of Intershield ENA300 consists of epoxy resins having epoxy equivalent weights within the interval 150-700 and a mannich base type adduct as curing agent. The viscosity is less than 140 KU at 30° C. The ratio between the hydrogen equivalents of the one or more curing agents and the epoxy equivalents of the one or more epoxy resins is in the range of 60:100 to 120:100. The ratio between the hydrogen equivalents of the one or more curing agents and the epoxy equivalents of the one or more epoxy resins is not affected when adding fibres 1-4. The total amount of epoxy-based binder system is in the range of 35-80% by solids volume of the paint. The total amount of pigments and fillers is in the range of 10-40% by solids volume of the paint.

HEMPADUR 45143-11480, HEMPADUR 15500-50900, HEMPADUR PRO 45601-19870 and Intershield ENA 300 added respectively 7.4% and 10.7% solids volume of the paint of fibres are suitable paint compositions according to the invention. These paint compositions are very robust and can withstand the corrosive environment of a ballast tank.

Methods
Preparation of Test Panels

Where not specifically stated elsewhere, the test panels used are applied according to the procedure stated below.

Steel panels are coated with 2×150 μm (dry film thickness) of the paint to be tested by airless spraying with a recoat interval of 24 hours between the two coats. The steel panels used are all cold rolled mild steel, abrasive blasted to Sa 3 (ISO 8501-1), with a surface profile equivalent to BN 10 (Rugotest No. 3). After the samples have been coated, the panels are conditioned at a temperature of 23±2° C. and 50±5% relative humidity for a period of 7 days if not otherwise stated.

The Thermal Cycling Resistance Test

This method is conducted according to the Nace standard TG 260. It is an accelerated thermal fatigue test, in which a coating is subjected to fast, and extreme temperature changes, thereby inducing thermal and mechanical fatigue within the coating. It is conducted in a programmable temperature controlled oven, capable of reaching upper and lower temperatures of ±60° C. to −30° C., within a two hour time period. The panels used are steel panels in v-shape prepared by bending a steel plate (100×200×1.5 mm) 90° along the central axis lengthwise. An even layer of the paint composition is applied by airless spraying from a 20-30 cm distance on to the surface representing the 90° angle, aiming to achieve an average dry film thickness of approximately 1000 μm. The maximum dry film thickness which is obtained in the bottom of the V is stated for each of the paint compositions in the relevant tables. The distribution of the dry film thickness along the surface depends on how the panel is positioned during spray application and drying. Two variants are used:

Variant A: The panel to be applied is placed so that each side of the V-shaped panel forms a 45° angle with horizontal.
Variant B: The panel to be applied is placed on a plate with one of the sides of the V-shaped panel in full contact with the plate and oriented horizontally in respect of the earth.

The variant used appears from the relevant tables.

After coatings are applied, the panels shall be post cured at 60° C. for one week to dry out any volatile components before running the thermal cycling test. During drying and post curing, the panel is placed as during application. At each inspection, the samples are removed to be examined under microscope for any cracks in the coating.

The Tensile Strength Test

The test method is based on ASTM D 2370-92. It covers the procedure for assessing the relative elongation, the tensile strength, and the stiffness (modulus of elasticity) of a coating of paint, varnish or related product when tested as a free film and subjected to testing in a tensile strength test machine under standard conditions. The tensile strength test is performed on a Zwick Universal Testing Machine Z2.5/TN1S equipped with load cells of 50, 500, or 2500 N. The coating (2×150 μm dry film thickness) is applied on overhead foil which is cut into test strips of 20×100 mm 24 hours after application of final layer of coating. The overhead foil is subsequently removed from the strips, leaving test strips of free coating film. After a sample has been conditioned, it is clamped in the test machine sample holders. One sample holder has a fixed position and the other is moved away at a constant speed of 10 mm per min. The paint sample is elongated until breakage of the sample occurs, and the values of stress (force/area) and strain (elongation) are recorded. The higher stress value the better tensile strength, the higher elongation the more flexible. The procedure is repeated in triplicate for each of the test films made. The average elongation until breakage is calculated. The average elongation for the reference composition without fibres is set to 100.

The Pull-Off Test

Pull-off test according to ISO 4624 (ASTM D 4541) with P.A.T hydraulic adhesion tester. This test covers the determination of the pull-off strength of a coating or coating system, by determining the greatest perpendicular force (in tension) that a surface area can bear, before a plug of material is detached. Failure will occur along the weakest plane within the system comprised of the test fixture, adhesive coating system and substrate. After the panels have been coated and conditioned, a steel pin doll with a surface area of 1.58 cm$^2$ is glued onto the paint surface on the test panel (150×200×1.5 mm) with Standard Araldit glue, cured for 24 hours. After curing of the glue, the paint film is cut free around the dolls down to the substrate and the dolls are pulled off using the P.A.T hydraulic adhesion tester. The pull-off value (tensile strength) is noted, and converted in relation to the area of the doll and stated in MPa. The type of rupture is also noted (cohesive/adhesive). The pull-off value for the reference composition without fibres is set to 100.

The Impact Test

Impact (effect of rapid deformation), according to ISO 6272-1, Falling-weight test, large-area indenter using an Erichsen Impact Tester. This test method covers a procedure for rapidly deforming by impact a coating film and its substrate and for evaluating the effect of such deformation. After the panels have been cured and conditioned, a falling-weight of 1 kg, with an indenter-head of 20 mm Ø, is dropped a distance onto the test panel (150×100×1.5 mm). The panel is supported by a steel fixture, with a hole of 27 mm Ø, centred under the indenter. When the indenter strikes the panel, it deforms the coating and the substrate. By gradually increasing the distance, the weight drops, the point at which failure usually occurs can be determined. The impact value is reported as the highest impact, reproduced 5 times, which results in no visible cracks and no adhesion failure in the paint film. The impact value is stated as kg·m (Joule). A possible rupture is evaluated as cohesive or adhesive.

Preparation of Test Paints

The base component of a commercial paint was thoroughly stirred, fibres were added and the composition was mixed on a Diaf dissolver for 15 minutes at 1,000 rpm to a homogenous mixture. Just before the application, the commercial curing agent was added and the paint composition was mixed to a homogenous mixture. The materials as well as the ratios used appear from Tables 1-3. The results are shown in Tables 4-11.

Composition of Test Paints

TABLE 1

|  | HEMPADUR 45143-11480 | Model paint A1 | |
| --- | --- | --- | --- |
|  | Amount (parts by wet weight) | Amount (parts by wet weight) | Amount (% solids volume) |
| Hempadur Base (45148-11480) | 81.9 | 81.9 |  |
| Hempadur curing agent (97820-00000) | 18.1 | 18.1 |  |
| Mixed product | 100.0 | 100.0 | 92.6 |
| Fibre 1 | — | — | — |
| Fibre 2 | — | — | — |
| Fibre 3 | — | — | — |

TABLE 1-continued

|  | HEMPADUR 45143-11480 | Model paint A1 | |
|---|---|---|---|
|  | Amount (parts by wet weight) | Amount (parts by wet weight) | Amount (% solids volume) |
| Fibre 4 | — | 5.2 | 7.4 |
| SVR | 60.0 | 62.8* | |
| Epoxy-based binder system % Solids Volume | 52.9 | 49.3 | |
| Pigments and fillers % Solids Volume | 26.9 | 25.0 | |

*Calculated based on measured value for HEMPADUR 45143-11480.

TABLE 2

|  | HEMPADUR 15500-50900 | Model paint B1 | |
|---|---|---|---|
|  | Amount (parts by wet weight) | Amount (parts by wet weight) | Amount (% solids volume) |
| Hempadur Base (15509-50900) | 93.8 | 93.8 | |
| Hempadur curing agent (97580-00000) | 6.2 | 6.2 | |
| Mixed product | 100.0 | 100.0 | 92.6 |
| Fibre 1 | — | 8.2 | 7.4 |
| Fibre 2 | — | — | — |
| Fibre 3 | — | — | — |
| Fibre 4 | — | — | — |
| SVR | 68.0 | 70.2* | |
| Epoxy based binder system (% Solids Volume) | 59.0 | 54.6 | |
| Pigments and fillers (% Solids Volume) | 37.3 | 34.6 | |

*Calculated based on measured value for HEMPADUR 15500-50900.

TABLE 3

|  | Hempadur Pro 45601-19870 Amount (parts by wet weight) | Model paint C1 Amount (parts by wet weight) | Model paint C1 Amount (% solids volume) | Model paint C2 Amount (parts by wet weight) | Model paint C2 Amount (% solids volume) | Model paint C3 Amount (parts by wet weight) | Model paint C3 Amount (% solids volume) | Model paint C4 Amount (parts by wet weight) | Model paint C4 Amount (% solids volume) |
|---|---|---|---|---|---|---|---|---|---|
| HEMPADUR PRO Base (45609-19870) | 85.4 | 85.4 | | 85.4 | | 85.4 | | 85.4 | |
| Hempadur Pro curing agent (97330-00000) | 14.6 | 14.6 | | 14.6 | | 14.6 | | 14.6 | |
| Mixed product | 100.0 | 100.0 | 89.3 | 100.0 | 92.6 | 100.0 | 92.6 | 100.0 | 92.6 |
| Fibre 1 | — | 15.4 | 10.7 | — | — | — | — | — | — |
| Fibre 2 | — | — | — | 5.6 | 7.4 | — | — | — | — |
| Fibre 3 | — | — | — | — | — | 10.8 | 7.4 | — | — |
| Fibre 4 | — | — | — | — | — | — | — | 5.2 | 7.4 |
| SVR | 66.0 | 69.3* | | 68.3* | | 68.3* | | 68.3* | |
| Epoxy based binder system (% Solids Volume) | 51.6 | 46.1 | | 47.8 | | 47.8 | | 47.8 | |
| Pigments and fillers (% Solids Volume) | 28.5 | 25.4 | | 26.3 | | 26.3 | | 26.3 | |

*Calculated based on measured value for HEMPADUR Pro 45601-19870.

Results
Results of Tensile Strength Test

TABLE 4

|  | HEMPADUR 45143-11480 | Model paint A1 |
|---|---|---|
| Elongation at break 25° C. | 100 | 121 |
| Elongation at break 60° C. | 100 | 117 |

TABLE 5

|  | HEMPADUR 15500-50900 | Model paint B1 |
|---|---|---|
| Elongation at break 25° C. | — | — |
| Elongation at break 60° C. | 100 | 162 |

Results of the Thermal Cycling Resistance Test

Commercial products like HEMPADUR 15500-50900, HEMPADUR PRO 45601-19870 and Intershield ENA300 are not sensitive to cracking when applied according to specification but a higher flexibility is required if the products are applied in extreme high dry film thickness like 1000 μm or above.

TABLE 6

| Maximum dry film thickness: 5500-6200 μm* | HEMPADUR 15500-50900 | Model paint B1 |
|---|---|---|
| After 13 cycles | Cracking | No cracking |

*Positioning of panel during spray application and drying: variant A.

TABLE 7

| maximum dry film thickness: 1600-2200 μm* | HEMPADUR PRO 45601-19870 | Model paint C1 | Model paint C2 | Model paint C3 | Model paint C4 |
|---|---|---|---|---|---|
| After 13 cycles | Cracking | No cracking | No cracking | No cracking | No cracking |

*Positioning of panel during spray application and drying: variant B.

Results of the Pull-Off Test

TABLE 8

| Paint Composition | Pull-off value |
|---|---|
| HEMPADUR 45143-11480 | 100 |
| Model paint A1 | 100 |
| HEMPADUR15500-50900 | 100 |
| Model paint B1 | 95 |
| HEMPADUR PRO 45601-19870 | 100 |
| Model paint C1 | 98 |

The results show that the good adhesion between the layers and the high strength within each layer is maintained at the same high level after fibres are added.

TABLE 9

| | Intershield ENA300 | Model paint D1 | | Model paint D2 | |
|---|---|---|---|---|---|
| | Amount (parts by wet weight) | Amount (parts by wet weight) | Amount (% solids volume) | Amount (parts by wet weight) | Amount (% solids volume) |
| ENA 300 Base | 78.3 | 78.3 | | 78.3 | |
| ENA 303 curing agent | 21.7 | 21.7 | | 21.7 | |
| Mixed product | 100.0 | 100.0 | 92.6 | 100.0 | 92.6 |
| Fibre 1 | — | 10.7 | 7.4 | — | — |
| Fibre 2 | — | — | — | — | — |
| Fibre 3 | — | — | — | 11.3 | 7.4 |
| Fibre 4 | — | — | — | — | — |
| SVR | 60 | 61.8* | | 61.8* | |
| Epoxy based binder system (% solids volume) | 73.1% ± 5%** | 67.7 ± 5%** | | 67.7 ± 5%** | |
| Pigments and fillers (% solids volume) | 24.4% ± 5%** | 22.6 ± 5%** | | 22.6 ± 5%** | |

*Calculated based on value stated on datasheet.
**Calculated based on composition determined by analysis of the product.

Results of the Thermal Cycling Resistance Test

TABLE 10

| Maximum dry film thickness: * 400-550 | Intershield ENA300 | Model paint D1 | Model paint D2 |
|---|---|---|---|
| After 192 cycles | No cracking | No cracking | No cracking |
| After 252 cycles | Cracking | No cracking | No cracking |
| After 384 cycles | Cracking | No cracking | No cracking |
| After 500 cycles | Cracking | No cracking | No cracking |

* Positioning of panel during spray application and drying: variant A

Exposing an epoxy coating to 200 or more cycles in the thermal cyclic resistance test is a very demanding test. Typically a commercial product, e.g. HEMPADUR PRO 45601-19870, will start cracking after 200 to 250 cycles at specified dft. The test can be used to establish the relative level of cracking resistance even when the coating is applied in a total dry film thickness of only 250-500 μm (typical dft specified for ballast tank coatings).

Results of the Impact Test

TABLE 11

| Paint Composition | Impact value |
|---|---|
| Intershield ENA300 | 45 |
| Model paint D1 | 60 |
| Model paint D2 | 55 |
| Hempadur Pro 45601 | 50 |
| Model paint C4 | 60 |
| Hempadur 45143 | 40 |

TABLE 11-continued

| Paint Composition | Impact value |
|---|---|
| Model paint A1 | 50 |

The invention claimed is:

1. A paint composition having a viscosity of at the most 140 KU at 30° C. and comprising:

35-80% by solids volume of the paint of an epoxy-based binder system having a ratio between the hydrogen equivalents and the epoxy equivalents in the range of 60:100 to 120:100, wherein the epoxy-based binder system comprises (a) one or more epoxy resins selected from the group consisting of bisphenol A and bisphenol F and (b) one or more polyamidoamine or Mannich base curing agent, and 0.5-30% by solids volume of the paint of one or more mineral fibres having an average length, of at most 250 μm.

2. The paint composition according to claim 1, wherein the epoxy-based binder system comprises:
   a) an epoxy resin of bisphenol A; and
   b) one or more curing agents of Mannich Bases.

3. The paint according to claim 1, wherein the one or more epoxy resins have an epoxy equivalent weight of 100-1500.

4. The paint composition according to claim 1, wherein the one or more fibres have an average length of 50-170 μm and a ratio between the average length and the average thickness of at least 2.

5. The paint composition according to claim 1, further comprising:
   10-45% by solids volume of the paint of fillers and pigments,
   0-30% by solids volume of the paint of plasticizers, and
   0-10% by solids volume of the paint of additives.

6. The paint composition according to claim 1, further comprising 1-7% by solids volume of the paint of an aluminium pigment.

7. The paint composition according to claim 1, wherein the epoxy-based binder has the ratio between the hydrogen equivalents and the epoxy equivalents in the range of 70:100 to 110:100.

8. The paint composition according to claim 1, wherein the epoxy-based binder system comprises a bisphenol A epoxy resin having an epoxy equivalent weight of 150-700 and a polyamidoamine curing agent.

9. A method for the establishment of a crack resistant epoxy paint coat at the interior surface of a liquid storage tank, said method comprising:
   (i) applying the paint composition of claim 1 onto the surface of the interior of a liquid storage tank thereby forming a curable paint film on said surface, and
   allowing said curable paint film to cure thereby forming the epoxy paint coat.

* * * * *